United States Patent
Schott

[15] 3,642,103
[45] Feb. 15, 1972

[54] DIFFERENTIAL CLUTCH RELEASED BY HYDRAULIC BRAKE APPLICATION

[72] Inventor: Robert E. Schott, New Berlin, Wis.
[73] Assignee: Allis Chalmers Manufacturing Company, Milwaukee, Wis.
[22] Filed: Jan. 16, 1970
[21] Appl. No.: 3,370

[52] U.S. Cl. ........................... 192/4 A, 192/13 R, 74/710.5
[51] Int. Cl. ............................. B60k 29/02, F16h 57/10
[58] Field of Search ........................ 192/4, 4 A, 13; 74/710.5

[56] References Cited

UNITED STATES PATENTS

| 3,292,720 | 12/1966 | Harvey | 74/710.5 X |
| 3,446,320 | 5/1969 | Schott | 192/4 A |
| 3,463,277 | 8/1969 | Allori et al. | 192/4 A |
| 3,467,212 | 9/1969 | Doll | 74/710.5 X |
| 3,498,427 | 3/1970 | Bingley | 192/4 A X |

*Primary Examiner*—Benjamin W. Wyche
*Attorney*—Arthur L. Nelson, Robert B. Benson and Kenneth C. McKivett

[57] ABSTRACT

A hydraulic release for a differential lock releasing in response to actuation of a relay valve having a hydraulic actuator in the hydraulic brake system for each of the rear wheels.

10 Claims, 1 Drawing Figure

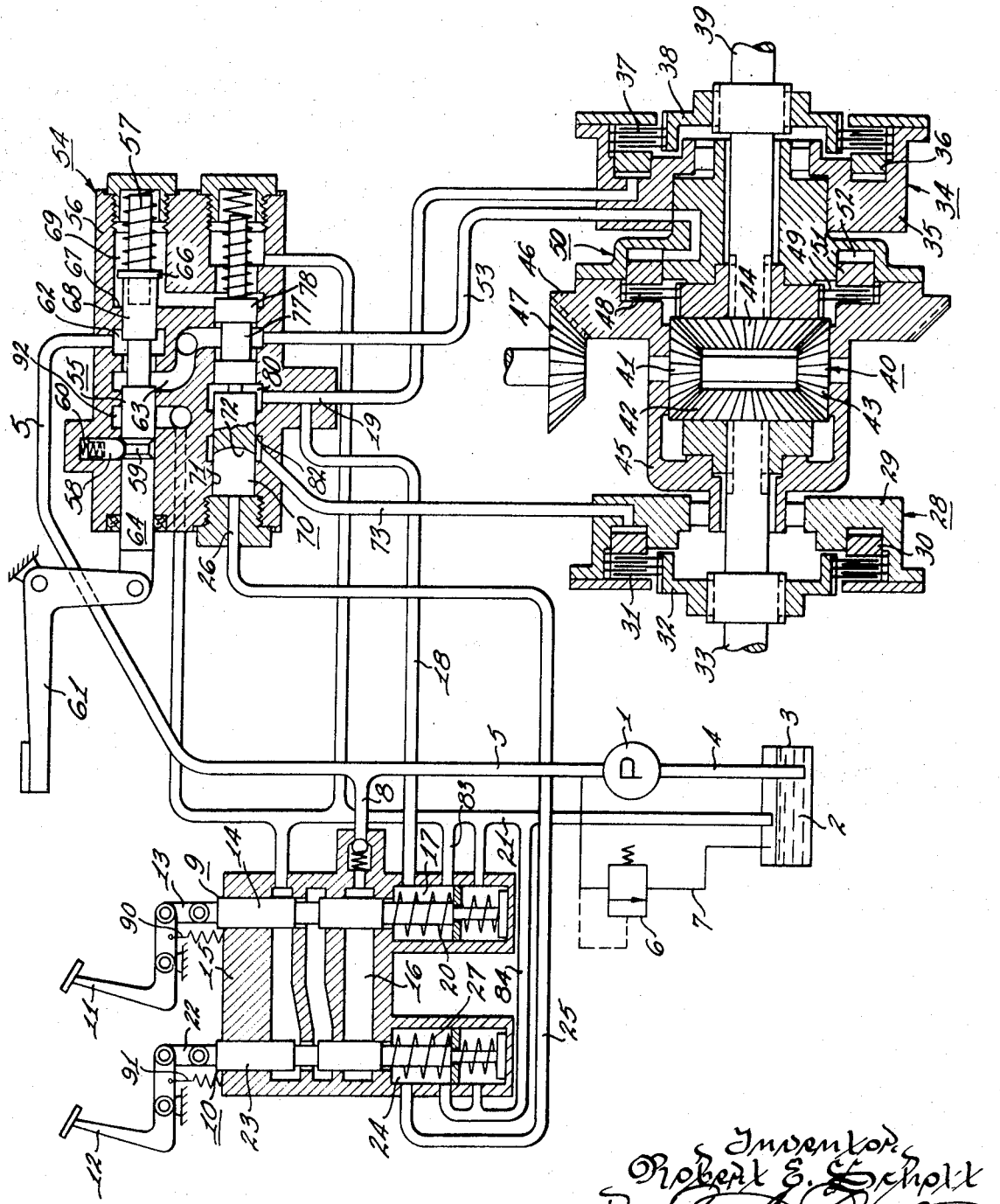

DIFFERENTIAL CLUTCH RELEASED BY HYDRAULIC BRAKE APPLICATION

This invention relates to a differential lock and more particularly to the hydraulic actuator connected to the hydraulic systems for each of the rear wheel brakes which releases the differential lock by actuation of either or both of the rear wheel brakes.

Conventional tractors employ a differential in the final drive system for driving the rear axles. The differential permits either wheel to rotate at a different rate than the other wheel which permits turning of the vehicle. While the differential action on the rear wheels is necessary in turning, it is also desirable to lock the differential so that both the right and the left-hand final drive axles turn at a constant rate when the vehicle is traveling straight ahead. With the differential locked, both rear wheels turn in unison so that a variable traction of the rear wheels will not cause slippage of the one wheel and loss of the draft to the drawbar.

The control operating the differential lock shown herein has a manual means to engage the lock. The differential lock control can be manually engaged and automatically disengaged. Usually when a tractor is turned to the right or left, one of the brakes is usually applied. An automatic release for releasing the differential lock at a time when the vehicle is about to be turned to the right and to the left is desirable and accordingly, the use of the hydraulic brake pressure to disengage the differential lock is convenient. There are however, circumstances when both of the rear wheel brakes might be applied and it is desirable to release the differential lock.

Accordingly this invention provides a means whereby the differential lock can be released by actuation of either one or both of the rear wheel brakes. A hydraulic actuator for a relay valve controls the flow of pressurized fluid to the control valve which controls the flow of pressurized fluid to the differential lock. The actuator for the relay valve is in the hydraulic rear wheel brake circuit which provides a convenient means for releasing the differential clutch on the differential between the rear wheels.

It is an object of this invention to provide hydraulic means for release for the differential lock in response to actuation of either rear wheel brake or both the rear wheel brakes.

It is another object of this invention to provide a differential lock release controlled by a relay valve having an actuator in the hydraulic circuit for each of the rear wheel brakes.

It is a further object of this invention to provide a differential lock release having a relay valve with an actuator in the hydraulic circuit for each of the rear wheel brakes whereby the relay valve permits the flow of pressurized fluid to the control valve actuator. The control valve moves to prevent flow of pressurized fluid to the differential clutch and thereby permits the rear axles connected to the differential to rotate freely relative to each other.

The objects of this invention are accomplished by providing a hydraulically actuated clutch in the differential. The clutch has a hydraulic actuator which engages the clutch in response to admission of pressurized fluid in the hydraulic actuator. A source of pressurized fluid supplies pressurized fluid to the actuator of the differential clutch through a control valve which controls the flow of pressurized fluid. A relay valve has an actuator in each of the brake circuits biasing the relay valve to a position to divert pressurized fluid to the actuator of the control valve which in turn closes communication between the source of pressurized fluid to the clutch actuator and vents the clutch actuator to sump for release of the differential.

Hydraulic operating means are provided in the actuator for the relay valve in which a single plunger is connected to each of the brake circuits. Accordingly, when either of the hydraulic brake circuits is pressurized, the relay valve diverts pressurized fluid to the actuator for the control valve and thereby releasing the differential lock. When hydraulic fluid pressurizes both of the plungers the result is the same, the differential clutch is released.

The preferred embodiment of this invention will be described in the following paragraphs and illustrated in the attached drawing.

The drawing illustrates a hydraulically actuated differential lock and the hydraulically actuated rear wheel brakes.

Referring to the drawing, the pump 1 receives pressurized fluid 2 from the reservoir 3. The conduit 4 transmits hydraulic fluid to the pump. The pump 1 discharges pressurized fluid into the conduit 5 connected to the pressure-limiting valve 6, which is normally closed, permits the discharge of pressurized fluid through the line 7 to the reservoir 3 when a predetermined pressure is reached in the conduit 5.

The conduit 5 is connected through conduit 8 to the right-hand brake valve 9 and the left-hand brake valve 10. The brake lever 11 operates the right-hand brake while the brake lever 12 operates the left-hand brake. The link 13 connects the brake lever 11 to the spool 14 which moves reciprocally within the brake valve housing 15. The pressurized fluid passes through the conduit 8 into the pressure chamber 16 of valve housing 15. As the spool 14 is moved upwardly the conduit 8 is connected to the chamber 17 and conduit 18 permitting the flow of pressurized fluid into the passage 19.

When the brake lever 11 is released the spring 20 and 90 biases the spool 14 downwardly whereby the spool releases the pressure from the chamber 17 through conduits 83 and 21. The return conduits 83 and 21 are then in communication with the chamber 17 and the reservoir 3.

The left-hand lever 12 is connected by a link 22 to the spool 23. When the lever 12 is depressed the spool 23 moves upwardly permitting the flow of pressurized fluid from the pressure chamber 16 into the chamber 24 which is connected by conduit 25 to the passage 26. When the lever 12 is released the spring 27 and 91 biases the spool 23 downwardly closing communication between the chamber 16 and the conduit 25. Conduit 84 and 21 are then in communication with chamber 24 and reservoir 3. A description of the clutch in the differential will be described subsequently. The left-hand wheel brake 28 comprises brake housing 29 defining the hydraulic wheel cylinder receiving the hydraulic wheel piston 30. The hydraulic wheel piston 30 compresses the disc stack 31 which has alternate brake discs connected to the housing and the brake hub 32 which is splined to the rear axle 33.

Similarly the right-hand brake 34 comprises a brake housing 35 defining a wheel cylinder receiving the piston 36 which compresses the disc stack 37 to operate the right-hand rear wheel brake. The disc stack includes alternate interleaved brake discs alternately connected to the brake housing 35, and the brake hub 38 which is splined to the right-hand rear axle 39.

The right-hand rear axle 39 and the left-hand rear axle 33 are connected to the differential 40 comprising the differential gears 41, 42, 43 and 44. The differential housing 45 is connected to the ring gear 46 which is driven by the pinion 47. The ring gear 46 is splined to a plurality of clutch discs 48 while the pinion 44 is splined to a plurality of alternate clutch discs 49. The hydraulic actuator for clutch 50 includes the piston 51 which defines the pressurizing chamber 52 which receives pressurized fluid from the conduit 53. The conduit 53 is connected to a valve means 54.

The valve means 54 consists of a control spool 55 reciprocally mounted within the housing 56 biased to the left-hand position by the spring 57. The detent 58 received in the annular recess 59 retains the position of the spool 55 as shown in response to the biasing force of the detent spring 60. The manual lever 61 manually reciprocates the spool 55 and provides a means of positioning the spool in the position as shown.

The conduit 5 is connected to valve means 54 and supplies pressurized fluid to the chamber 62 which is in turn in communication with the passage 63 and conduit 53 in the position as shown. In this position pressurized fluid is supplied to the pressurizing chamber 52 of the actuator 51 and the differential is locked.

The spool 55 defines a control valve 64 which controls the flow of pressurized fluid from the chamber 62. When the spool 55 is moved to its left-hand position the washer 66 engages the shoulder 67 and the land 68 closes communication between the conduit 5 and passage 63. Chamber 92 and 63 are connected through conduit 21 to the reservoir 3. Shifting of the spool 55 to this position is accomplished by supplying pressurized fluid to the chamber 69.

The plunger 70 is received in the cylindrical opening 71. The plunger 70 is formed with a slot 72 in communication with the passage 26 which permits the flow of pressurized fluid through the slot 72 to the conduit 73 which in turn pressurizes fluid in the conduit 73 and actuates the piston 30 for the left-hand hydraulic brake 28. Pressurized fluid also biases the plunger 70 to the right-hand position which in turn moves the plunger 77 and causing the land 78 to permit communication between the passage 63 and the chamber 69. Pressurized fluid in the chamber 69 in turn will cause the spool 55 to move to the left-hand direction closing communication between conduit 5 and conduit 53 and opening communication between chamber 63 and 92 which is connected to reservoir 3 for releasing the differential clutch.

Similarly when the right-hand brake 34 is actuated, pressurized fluid flows into the chamber 80 which in turn biases the plunger 70 in the left-hand direction and the plunger 77 in the right-hand direction. As the plunger 77 moves in the right-hand direction pressurized fluid is permitted to flow from the passage 63 to the chamber 69 which in turn biases the spool 55 to the left-hand direction closing communication between conduit 5 and conduit 53 and opening communication between chamber 63 and 92 and reservoir 3 which in turn releases the differential clutch.

When both of the brake levers 11 and 12 are activated, pressurized fluid flows into the chamber 80 and into the chamber 82 and the pressurized fluid will bias the spool 77 in the right-hand direction placing communication between the passage 63 and the chamber 69. Pressurized fluid in the chamber 69 biases spool 55 in the left-hand direction and closes communication between the passage conduit 5 and conduit 53 and opening communication between chamber 63 and 92 which releases the differential 50.

The operation of this device will be described in the following paragraphs.

The pump 1 supplies pressurized fluid to the brake valves 9 and 10 to actuate the brakes 34 and 28 respectively. The pump 1 also supplies pressurized fluid to the valve means 54 which controls the flow of pressurized fluid to the actuator for differential clutch 50. When the control spool 55 for the differential valve is in the position shown, pressurized fluid flows from the pump through the conduit 5 and conduit 53 to actuate the clutch 50 for the differential 40. Chamber 69 is connected to conduit 21 and reservoir 3. In this position, the rear axles 33 and 39 rotate synchronously.

When the left-hand brake lever 12 is depressed the pressurized fluid from the pump 1 flows through chamber 16, valve 10, conduit 25, slot 72 and conduit 73 to engage the left-hand brake 28. Pressurized fluid in the slot 72 of the plunger 70 biases the plunger in the right-hand direction carrying the plunger 77 closing communication between chamber 69, conduit 21, and reservoir 3 and placing communication between the passage 63 and the chamber 69. Pressurized fluid in chamber 69 biases the spool 55 in the left-hand direction severing communication between the conduit 5 and the conduit 53 and opening communication between chambers 63, 92, conduit 21 and reservoir 3. This in turn releases the clutch 50 of the differential 40.

When the right-hand brake level 11 is depressed pressurized fluid from the pump 1 flows through a valve 9 to the chamber 17 through conduit 18 and 19 with pressurized fluid actuating the right-hand brake 34. The pressurized fluid in passage 19 also goes into the chamber 80 which in turn biases the plunger 77 in the right-hand position. This closes off chamber 69 from reservoir 3 and places communication between the passage 63 and the chamber 69 biasing the spool 55 in the left-hand direction severing communication between the conduit 5 and conduit 53 placing communication between chambers 92, 63 and reservoir 3. Accordingly, the differential clutch 50 is released.

When brake levers 11 and 12 are depressed, pressurized fluid flows through the same conduits as previously described actuating both the right and left-hand brakes 34 and 28 and also flows through the slot 72 in plunger 70 and into chamber 80 which in turn biases the plunger 77 to the right-hand position severing communication between chamber 69 and reservoir 3 placing communication between the passage 63 and the chamber 69 which in turn shifts the spool 55 to the left-hand direction in response to the pressure of the fluid thereby closing communication between conduits 5 and 53 and opening chambers 63 and 92 to reservoir 3. This in turn releases the differential clutch for the differential 40.

To reposition the spool 55, the manual lever 61 is moved downwardly until the detent 58 drops in the annular recess 59. The spool 55 is then retained in this position until it is released automatically in response to pressurized fluid operating on the actuator for the spool 55.

I claim:

1. A vehicle having hydraulic brakes and a differential drive means connecting two final drive shafts, a hydraulic system including a source of pressurized fluid, a hydraulically actuated clutch locking said differential drive means for synchronously rotating said final drive shafts, a hydraulic control valve means including manual means controlling the flow of pressurized fluid from said source of pressurized fluid to said hydraulically actuated clutch and a hydraulic operating means biasing said valve to interrupting communication between said source of pressurized fluid and said hydraulically actuated clutch, a hydraulic brake circuit having brakes for braking each of said final drive shafts, a hydraulic relay valve connected through said control valve in said hydraulic system connected between said source of pressurized fluid said hydraulically actuated clutch and said hydraulic operating means of said control valve including actuating means hydraulically in communication with said hydraulic brake circuit for operating said relay valve means, a spring normally biasing said relay valve in one direction to a first position for directing flow of pressurized fluid from said source of pressurized fluid to said hydraulically actuated clutch, said relay valve comprising a hydraulic actuator in communication with one of said hydraulic brakes, a second hydraulic actuator in communication with the other of said hydraulic brakes, said hydraulic actuators both moving said relay valve in a second direction opposite to said first direction to a second position against the force of said spring means for directing the flow of pressurized flow from said source of pressurized fluid to said hydraulic operating means on said control valve means to close said control valve means and deenergize said clutch on said differential drive means to thereby deenergize said hydraulically actuated clutch in response to actuation of one or both of said hydraulic brakes.

2. In a vehicle having hydraulic brakes and a differential drive means connecting two final drive shafts as set forth in claim 1, wherein said hydraulic system includes a hydraulic actuator connected to said first brake and said second brake positioned in tandem for operation of said relay valve.

3. In a vehicle having hydraulic brakes and a differential drive means connecting two final drive shafts as set forth in claim 1, wherein said hydraulic system includes a single source of pressurized fluid for actuating said brakes and said differential clutch.

4. In a vehicle having hydraulic brakes and a differential drive means connecting two final drive shafts as set forth in claim 1, wherein said hydraulic brake circuit includes said hydraulic actuators for said relay valve wherein said actuators define passage means accommodating the flow of pressurized fluid through said actuators to said first and second brake for actuation of said brakes.

5. In a vehicle having hydraulic brakes and a differential drive means connecting two final drive shafts as set forth in claim 1, wherein said hydraulic system includes a reservoir, said relay valve includes a spring normally biasing said relay valve means to normally connect said hydraulic actuator means of said control valve to said reservoir when said hydraulic clutch is actuated.

6. In a vehicle having hydraulic brakes and a differential drive means connecting two final drive shafts as set forth in claim 1, wherein said control valve includes a spring normally biasing said control valve toward a closed position, a detent mechanism normally retaining said control valve in an open position to provide energization of said differential clutch.

7. In a vehicle having hydraulic brakes and a differential drive means connecting two final drive shafts as set forth in claim 1, wherein said hydraulic system includes a control valve including low-pressure passage means normally connecting the hydraulic operating means of said control valve to a low-pressure reservoir, said relay valve closing said low-pressure passage means and placing communication between said source of pressurized fluid and said hydraulic operating means of said control valve to thereby close said control valve when said brakes are actuated.

8. In a vehicle having hydraulic brakes and a differential drive means connecting two final drive shafts as set forth in claim 1, wherein said hydraulic system includes a spring normally biasing said control valve toward a closed position to thereby retain said control valve in a closed position in response to hydraulic actuation of said control valve when said brakes are actuated.

9. In a vehicle having hydraulic brakes and a differential drive means connecting two final drive shafts as set forth in claim 1, wherein said hydraulic system includes said hydraulic actuators for said relay valve means comprising a plunger defining a chamber connected to one of said brakes, a second plunger and said first plunger defining a second chamber connected to the other of said brakes wherein said second plunger disengages from said first plunger when said other brake and both of said brakes are actuated to operate said relay valve means and release said differential clutch.

10. In a vehicle having hydraulic brakes and a differential drive means connecting two final drive shafts as set forth in claim 1, wherein said actuators for said relay valve comprise a first plunger defining a chamber connected to one brake, a second plunger defining a second chamber connected to the the other brake with said second plunger engaging said first plunger when said one of said brakes is actuated.

* * * * *